United States Patent
Liu et al.

(10) Patent No.: US 11,765,115 B2
(45) Date of Patent: Sep. 19, 2023

(54) EMOJI RECOMMENDATION SYSTEM USING USER CONTEXT AND BIOSIGNALS

(71) Applicants: Fannie Liu, New York, NY (US); Yu Jiang Tham, Seattle, WA (US); Tsung-Yu Tsai, Issaquah, WA (US); Sven Kratz, Mercer Island, WA (US); Andrés Monroy-Hernández, Seattle, WA (US); Brian Anthony Smith, New York, NY (US)

(72) Inventors: Fannie Liu, New York, NY (US); Yu Jiang Tham, Seattle, WA (US); Tsung-Yu Tsai, Issaquah, WA (US); Sven Kratz, Mercer Island, WA (US); Andrés Monroy-Hernández, Seattle, WA (US); Brian Anthony Smith, New York, NY (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/389,212

(22) Filed: Jul. 29, 2021

(65) Prior Publication Data
US 2023/0035961 A1 Feb. 2, 2023

(51) Int. Cl.
G06F 15/16 (2006.01)
H04L 51/10 (2022.01)
G06F 3/0482 (2013.01)

(52) U.S. Cl.
CPC ............ *H04L 51/10* (2013.01); *G06F 3/0482* (2013.01)

(58) Field of Classification Search
None
See application file for complete search history.

(56) References Cited

U.S. PATENT DOCUMENTS 9,075,794 B2 7/2015 Leydon
9,665,567 B2 5/2017 Liu et al.
(Continued)

FOREIGN PATENT DOCUMENTS

EP 2713323 A1 4/2014
KR 1020170001490 A 1/2017
(Continued)

OTHER PUBLICATIONS

B. E. Tegicho and C. Graves, "Automatic Emoji Insertion Based on Environment Context Signals for the Demonstration of Pervasive Computing Features," SoutheastCon 2021,2021, pp. 1-6, doi: 10.1109/SoutheastCon45413.2021.9401878. (Year: 2021).*
(Continued)

*Primary Examiner* — Yves Dalencourt
(74) *Attorney, Agent, or Firm* — Culhane Meadows PLLC; Stephen J. Weed

(57) ABSTRACT

A system and method for recommending emojis to send by a messaging application includes receiving user biosignals from at least one sensor, receiving context information from at least one context source, and selecting, using a rule-based heuristic state selector, a list of plausible user states from possible heuristic states in a heuristic state table based on the received user biosignals and received context information. A state predictor determines, from at least the list of plausible user states and a user model of emojis previously sent in different user states, a list of user states and probabilities that the user will send an emoji for each user state given the context information. The recommended emojis are displayed for selection for sending by the messaging application in order from the highest to the lowest probabilities that the user will send the recommended emojis based on a selected plausible user state.

20 Claims, 5 Drawing Sheets

(56) References Cited

U.S. PATENT DOCUMENTS

| | | | |
|---|---|---|---|
| 9,792,909 B2* | 10/2017 | Kim | G10L 15/26 |
| 10,192,044 B2 | 1/2019 | Choe et al. | |
| 2013/0159919 A1* | 6/2013 | Leydon | G06F 40/274 |
| | | | 715/780 |
| 2016/0210962 A1* | 7/2016 | Kim | G06F 40/30 |
| 2016/0210963 A1* | 7/2016 | Kim | G10L 15/1822 |
| 2016/0253552 A1* | 9/2016 | Rihn | H04M 1/72454 |
| | | | 382/224 |
| 2017/0083506 A1* | 3/2017 | Liu | G06F 40/30 |
| 2017/0185581 A1 | 6/2017 | Bojja et al. | |
| 2017/0300291 A1* | 10/2017 | Lee | G06F 16/433 |
| 2018/0026925 A1* | 1/2018 | Kennedy | H04L 67/02 |
| | | | 715/753 |
| 2019/0250934 A1* | 8/2019 | Kim | G06V 40/28 |
| 2019/0294259 A1* | 9/2019 | Liu | H04L 51/04 |

FOREIGN PATENT DOCUMENTS

| | | | | |
|---|---|---|---|---|
| KR | 20180026983 A | * | 3/2018 | |
| WO | WO-2017006872 A1 | * | 1/2017 | G06F 3/01 |

OTHER PUBLICATIONS

International Search Report and Written Opinion for International Application No. PCT/US2022/037058, dated Nov. 7, 2022 (dated Jul. 11, 2022)—11 pages.

* cited by examiner

EMOJI RECOMMENDATION SYSTEM USING USER CONTEXT AND BIOSIGNALS

TECHNICAL FIELD

Examples set forth in the present disclosure relate to a context-based emoji recommendation system for communication devices. More particularly, but not by way of limitation, the present disclosure describes techniques for improving the relevance of emojis sent by users of messaging applications by using biosignals in addition to other user context sources as input for emoji recommendations.

BACKGROUND

Many existing messaging systems allow users to send emojis to each other. Since there are over 3500 emojis defined by the Unicode Standard as of September 2020, messaging systems usually present a curated subset of emojis to the user and also provide emoji search functionality. Unfortunately, curated emojis may not represent an optimal set for the user, and searching for an emoji can be time-consuming and difficult, as users' search terms may not match the text description of the emoji.

BRIEF DESCRIPTION OF THE DRAWINGS

Features of the various implementations disclosed will be readily understood from the following detailed description, in which reference is made to the appended drawing figures. A reference numeral is used with each element in the description and throughout the several views of the drawings. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawings are the following figures:

FIG. 2A illustrates a primary sensed emoji, FIG. 2B illustrates emojis of additional sensed states, and FIG. 2C illustrates emojis of additional non-sensed states;

DETAILED DESCRIPTION

Figure 1:
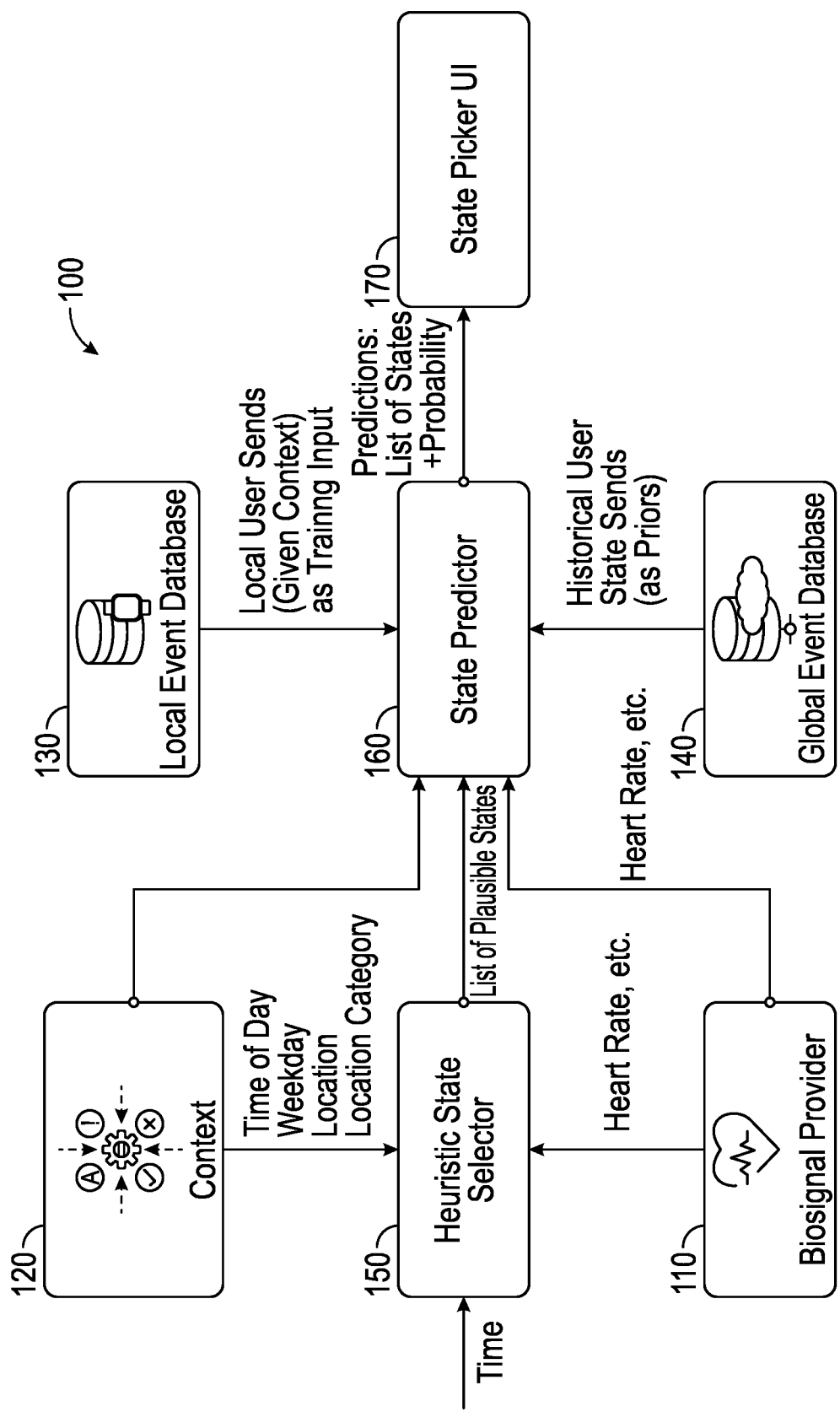
FIG. 1 illustrates a block diagram of the main system components, flow of data, and input of context data to an emoji recommendation system in a sample configuration.

A context-based emoji/Bitmoji recommendation system is provided that improves the relevance of emojis sent by users of messaging applications. It is noted that the terms emoji and Bitmoji will be used interchangeably herein. The recommendation system is designed to use biosignals in addition to other user context sources as input for an emoji recommendation that fosters social connection among the users of the messaging application. The system further combines use of a manually-defined rule-based component with a machine learning component to infer the final set of recommended emojis. A sample configuration of the emoji recommendation system will be described for implementation on a smartwatch such as the Apple watch, although it will be appreciated that the emoji recommendation system described herein may be implemented on other smartwatches as well as other portable electronic devices including smartphones, electronic eyewear devices, and other portable electronic devices that may implement a messaging application.

As noted above, many existing messaging systems allow users to send emojis to each other. Existing messaging systems usually present a curated subset of emojis to the user and also provide emoji search functionality. However, the curated emojis may not represent an optimal set for the user, and searching for an emoji can be time-consuming and difficult as the users' search terms may not match the text description of the emoji. One way to address this problem is to build a system that recommends emojis for users to send based on their context in order to improve social presence and awareness. User interfaces can make use of such recommendations to better order emojis according to their relevance to users, and therefore by the likelihood of being sent. In sample configurations, biometric signals are used as part of the context for emoji recommendations to further increase the accuracy of the emoji recommendations.

A messaging system and method are described herein that address these issues by recommending a set of emojis that are most likely to be used by the user and presenting the emojis in an order of most likely selection, thus speeding up the process of sending messages. To accomplish this, the messaging system relies on biosignals (heart rate, user activity type, etc.) and user context (location, time of day, previous sending activity, coarse location, etc.) to infer the most relevant set of emojis to present to the user. Besides making the messaging application more useful to the user, the system is designed to make the context and biosignal-driven emoji recommendations appear accurate and trustworthy.

This disclosure is thus directed to a system, method, and computer-readable medium containing instructions for recommending emojis to send by a messaging application. The system and method receive user biosignals from at least one sensor, receive context information from at least one context source, and select, using a rule-based heuristic state selector, a list of plausible user states from possible heuristic states in a heuristic state table based on the received user biosignals and received context information. A state predictor determines, from at least the list of plausible user states and a user model of emojis previously sent in different user states, a list of user states and probabilities that the user will send an emoji for each user state given the context information. The recommended emojis are displayed for selection for sending by the messaging application in order from the highest to the lowest probabilities that the user will send the recommended emojis based on a selected plausible user state.

In sample configurations, the system and method further include receiving the user's selection of an emoji from the displayed recommended emojis and sending a selected emoji to one or more message recipients. The state predictor also may implement machine learning techniques to provide predictions including a list of user states and the probability of sending an emoji for each user state from at least the list of plausible user states and the user model of emojis previously sent in different user states. In a sample configuration, the state predictor implements Naive Bayes classification to combine the plausible user states and context information to generate a list of most probable states in a user interface of the messaging application, where each state $S_i$ in $\{S_1, S_2, \ldots, S_n\}$ and context $C=\{C_1, C_2, \ldots, C_n\}$ is used to obtain a probability $P(S_i|C)$ of a state $S_i$ being sent given a context C by multiplying a prior probability $P(S_i)$ with a product of probabilities of the context C given $S_i$ as:

$$P(S_i|C)=P(S_i)*P(C_1|S_i)*P(C_2|S_i)* \ldots *P(C_n|S_i).$$

A user display interface may further display respective recommended emojis for sending by the messaging application as a primary sensed emoji, emojis of additional user states from the list of plausible user states, and emojis of user states that are not from the list of plausible states.

The following detailed description includes systems, methods, techniques, instruction sequences, and computer program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and methods described because the relevant teachings can be applied or practiced in a variety of ways. The terminology and nomenclature used herein is for the purpose of describing particular aspects only and is not intended to be limiting. In general, well-known instruction instances, protocols, structures, and techniques are not necessarily shown in detail.

The term "connect," "connected," "couple," and "coupled" as used herein refers to any logical, optical, physical, or electrical connection, including a link or the like by which the electrical or magnetic signals produced or supplied by one system element are imparted to another coupled or connected system element. Unless described otherwise, coupled, or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below. A sample emoji recommendation system and method will be described with respect to FIGS. 1-5.

The emoji recommendation system described herein is designed to generate, based on the user's current context, an ordered list of emojis/Bitmojis for display on the messaging application's user interface. The resulting display can, for instance, serve as a selection of Bitmojis for users to send to their contacts in an emoji-based messaging application.

In a sample configuration, the emoji recommendation system combines a rule-based, heuristic state selector where a developer can manually define sets of emojis that are plausible given a certain context, with a state predictor, that, based on the set of plausible states provided by the heuristic state selector, may use machine learning (ML) techniques to generate a list of states ordered according to the probability that the user will send them given the user's current context. The state predictor thus serves to refine the states provided by the heuristic state selector, adding additional knowledge to the system that would be very difficult to foresee by a developer generating a purely rule-based emoji recommender.

FIG. 1 illustrates a block diagram of the main system components, flow of data, and input of context data to an emoji recommendation system 100 in a sample configuration. As illustrated, the main system components of the emoji recommendation system 100 include a biosignal provider 110 (e.g., an Apple Healthkit) that provides biosignals such as heart rate as well as one or more context sources 120 that provide information such as time of day, day of the week, location, category of location, and the like. A local user event database 130 provides information from a local user for a given context as training input, while a global event database 140 provides historical user states as prior states. A heuristic state selector 150 provides a list of plausible states for a particular time based on the user's biosignals. The list of plausible states from the heuristic state selector 150 as well as the context information, biosignals, training input, and historical user states are provided to a state predictor 160 that uses machine learning techniques to provide predictions including a list of states and the probability of each state to a messaging user interface 170. In the case of an emoji recommendation system, the messaging user interface 170 presents the available emojis to the user as a list of the emojis that have the highest probability of correlating to the user's predicted state for user selection. Each of these system components is described in more detail below.

Biosignal Provider(s) 110

Biosignals are captured to provide an authentic expression of emotions and user activities. In current mobile operating systems, biosignal providers 110 are usually provided as an application programming interface (API), such as the Apple Healthkit in iOS. However, it will be appreciated by those skilled in the art that other third party devices can provide additional signals such as blood pressure, galvanic skin response, electroencephalography (EEG), electromyography (EMG), blood oxygenation, etc. In a sample configuration, a messaging application may use heart rate and detected user activity (e.g., sitting, standing, walking, running, cycling, etc.) as the primary biosignal inputs. The biosignal provider 110 feeds the biosignal data into the heuristic state selector 150 and the state predictor 160 as indicated.

Figure 5:
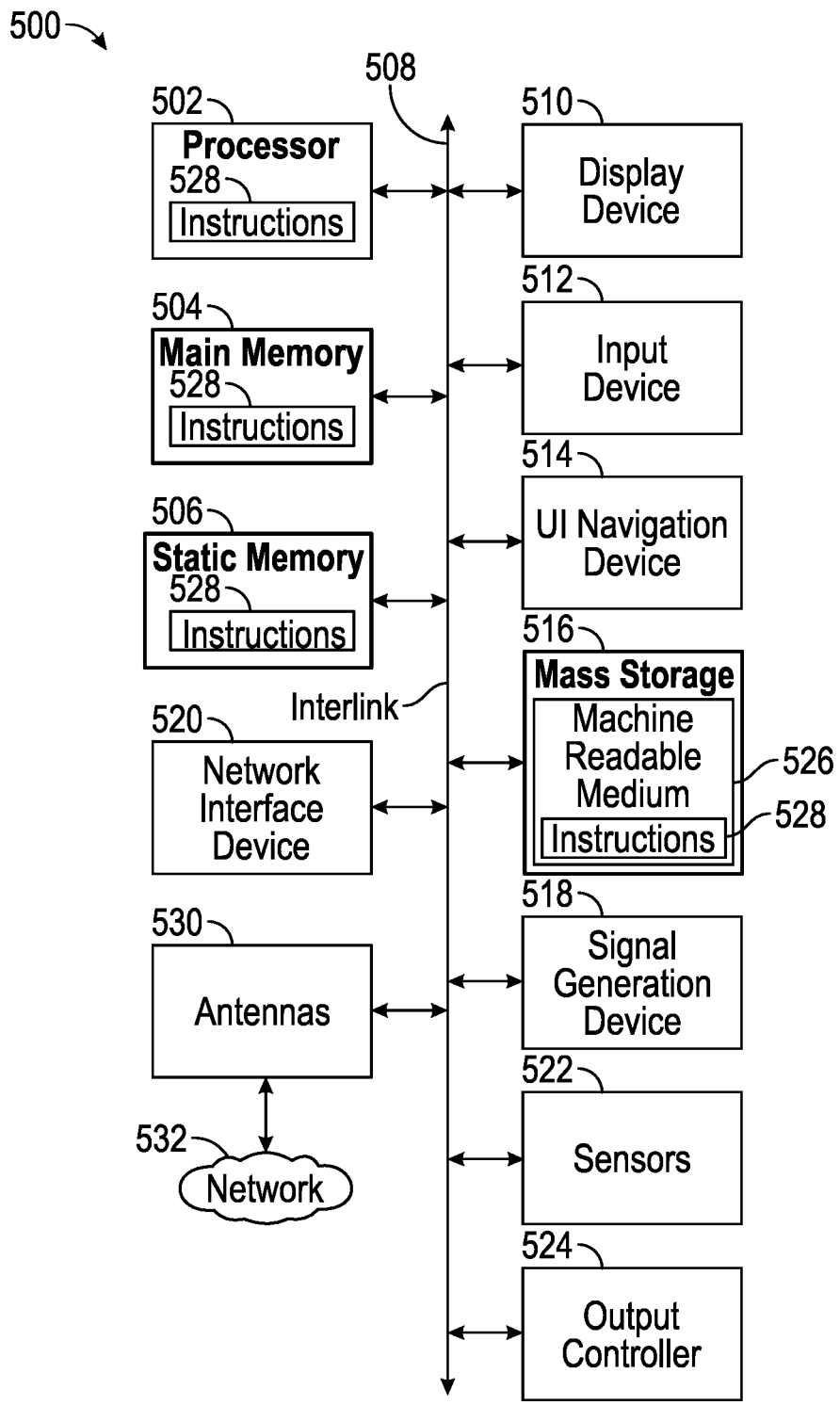
FIG. 5 illustrates a sample configuration of a computer system adapted to implement aspects of an emoji recommendation system in accordance with the systems and methods described herein.

It will be appreciated by those skilled in the art that the biosignal providers 110 may optionally include additional peripheral device elements such as ambient light and spectral sensors, biometric sensors, heat sensors, or other display elements integrated into the smartwatch or other portable electronic device implementing the emoji messaging application. The peripheral device elements may further include any I/O components such as output components, motion components, position components, or any other such elements described herein. For example, the biometric components may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components may include acceleration sensor components (e.g., accelerometer), gravitation sensor components, rotation sensor components (e.g., gyroscope), and so forth. The position components may include location sensor components to generate location coordinates (e.g., a Global Positioning System (GPS) receiver component), WI-FI® or BLUETOOTH® transceivers to generate positioning system coordinates, altitude sensor components (e.g., altimeters or barometers that detect air pressure from which altitude may be derived), orientation sensor components (e.g., magnetometers), and the like. Such positioning system coordinates also may be received over wireless connections from another mobile device or from a remote server (FIG. 5).

Context Sources 120

One or more context sources 120 provide information about the user's context to the state predictor 160. Context data may include any data that describes or is correlated with the user's context. For example, the context data may include one or more of temporal information (time of day, day of the week), location information (location, location category), or environmental information (current weather information, current air quality levels, etc.). The context sources may further include, for example, the user's electronic calendar whereby calendar events are provided to identify a specified context such as work versus exercising at home. Text analysis may also be provided to generate context information from messages sent to or from the user. Further context sources may include information about the wearer's mobile device such as, for example, the user's most recently launched app, apps currently running, device battery level, signal sources and signal strengths, light level, etc. The state predictor 160 may use such context information provided to it as part of the input for its model for predicting the most likely set of emojis that the user is going to send.

Local User Event Database 130

The local user event database 130 maintains a history of user inputs and the associated context. For example, the local user event database 130 may store an identification of the emoji by state name that the user has sent in a particular context. In a sample messaging application, the main use of the local user event database 130 is to provide additional context sources and user event logging to improve state prediction by training the default-initialized state predictor 160 whenever the messaging application is restarted or has been updated to a new version. A potentially more privacy-preserving alternative to storing the entire history of user context would be to incrementally train the prediction model of the state predictor 160 and only save a current snapshot of the prediction model on the mobile device's file system when the messaging app stops execution. This approach enables the emoji recommendation system 100 to start with global information that is adjusted to the individual user over time. Thus, each state predictor 160 would be tailored to the user, and different models would be provided to different users.

It will be appreciated that in sample configurations the local user event database 130 is preferably stored locally on the smartwatch or other personal electronic device for privacy reasons.

Global User Event Database 140

The global user event database 140 stores send events and associated predictions for all users of the messaging application. One of the main uses of the global user event database 140 is to generate prior probabilities for send events, based on the send statistics of all of the messaging application's users. Thus, in sample configurations, the global user event database 140 may be stored remotely from the user's portable electronic device and communicate with the user's portable electronic device over a suitable wireless connection. If privacy regulations allow, the global user event database 140 also may be used to store context priors, which would lead to better initialization (bootstrapping) of the state predictor 160 for installation of new applications.

Heuristic State Selector 150

The heuristic state selector 150 applies a set of fixed rules to determine a set of "sensed" states. This set of states serves as input to the state predictor 160. For example, the "sensed" states may represent emotional states indicating whether the user is happy, sad, calm, neutral, affectionate, agitated, etc. The "sensed" states may also indicate the activity state of the user such as sitting, standing, resting, running, etc. Generally, the "sensed states" may be categorized based on the types of messages that the user is likely to send. For example, the messages may be based on the user's activity (e.g., exercising, running, eating, shopping, sleeping, walking, working, etc.), emotional state (e.g., happy, calm, sad, excited, neutral, etc.), affection to the recipient (hand holding, hugging, etc.), greeting categories (e.g., wave, etc.), or a combination thereof. In a sample configuration, the heuristic state selector 150 may provide heart rate and activity (as provided by the biosignal provider 110) as well as context information such as time and location (e.g., at home, in vehicle, etc.) to a rule table for selection of the one or more states (and associated Bitmojis) relevant to the user's context. In contrast to the state predictor 160, the behavior (i.e., heuristics) of the heuristic state selector 150 may be defined by the developers at the time of development of the messaging application.

In sample configurations, the states are preselected by the messaging application developer. However, the emoji recommendation system 100 may be modified to permit the users to customize the states or to reweight the context inputs and to specify which emoji(s) to send in the customized state(s). For example, the user may identify "happy," "sad," and "excited" states and specify which emoji(s) to send for each state. Also, the user's activity may be part of the state along with the measured biosignals and location, each of which may be incorporated into the identified states. Such modifications may be implemented through an interface that allows modifications of the heuristics for state selection.

State Predictor 160

The state predictor 160 receives a set of "sensed" states from the heuristic state selector 150 and applies an additional inference step using the user's current context and past user behavior to output the set of input states ordered by the probability of the user selecting one of these states (and associated emoji/Bitmoji) to send. The state predictor 160 may determine a global probability that a user will send a particular emoji given the context and the user's physical and emotional state as evaluated using the provided context information and biosignals. In sample configurations, the state predictor 160 may be any (multi-class) machine learning (ML) classifier that, given the current user's context, may output a list of predicted states with corresponding probabilities. For example, the state predictor 160 may implement artificial neural networks, decision trees, support vector machines and Bayesian classification system, or other suitable techniques.

In a sample configuration, the state predictor 160 may use an approach based on Naive Bayes classification that combines plausible states and context information to generate a list of most probable states in the messaging application's user interface 170. For example, for each state $S_i$ in $\{S_1, S_2, \ldots, S_n\}$ and context $C=\{C_1, C_2, \ldots, C_n\}$, to obtain the probability $P(S_i|C)$ of a state $S_i$ being sent given a context C, one multiplies the prior probability $P(S_i)$ with the product of probabilities of the context C given $S_i$, i.e.:

$$P(S_i|C)=P(S_i)*P(C_1|S_i)*P(C_2|S_i)* \ldots *P(C_n|S_i).$$

In keeping with the Naive Bayes approach, it may be assumed that the $P(C_i|S_i)$ are stochastically independent of each other. For multiple states $S_i$, this approach yields a list of state-given-context probabilities that can be ordered by probability for use by the messaging application.

For this approach to work efficiently, plausible prior probabilities $P(S_i)$ (probability of sending state $S_i$) are used. Such probabilities may be obtained by, for example, looking at the send counts for each state of all users of the messaging application as provided by the global event database 140. The context probabilities $P(C|S)$ also may be obtained based on historical data. However, due to privacy issues, this data is generally stored only on individual users' devices and is accessible by the state predictor 160 only through the local user event database 130. The state predictor 160 thus builds a model for the individual user that is based on the user's prior selections and behaviors and uses the model to provide probabilities for predicting future selections. The system is trained (personalized) each time the user sends a message.

It will be appreciated by those skilled in the art that a common alternative to using histograms is to use Gaussian (or other) distributions based on the user's data. Gaussian distributions here would have a privacy advantage as they can be described solely via mean and standard deviation, which can be updated incrementally.

In sample configurations, the state predictor 160 uses a machine learning tool that implements a "self-learning process" that provides continuous optimization. By saving the actual results after the optimization to the initial model, a new model may be produced which includes learning and information from messages that have just been sent. If the new data points improve model fit and/or predictive ability, they may be added, and a new model generated. If the model fit and/or predictive ability decrease, review of the variable contributions is conducted to identify new variables/interactions/transformations to determine if the new message is an outlier. As the knowledgebase grows and models improve, the machine learning tool may be used to more accurately predict the emojis to be sent by the user in different states.

Messaging User Interface 170

The messaging user interface 170 takes the output of the state predictor 160 and displays the predicted states as Bitmojis for the user to send. The messaging user interface 170 can be designed as a simple list, a button bar or, in more advanced cases, may be embedded into an augmented reality (AR) lens or other wearable device application.

Figure 2C:
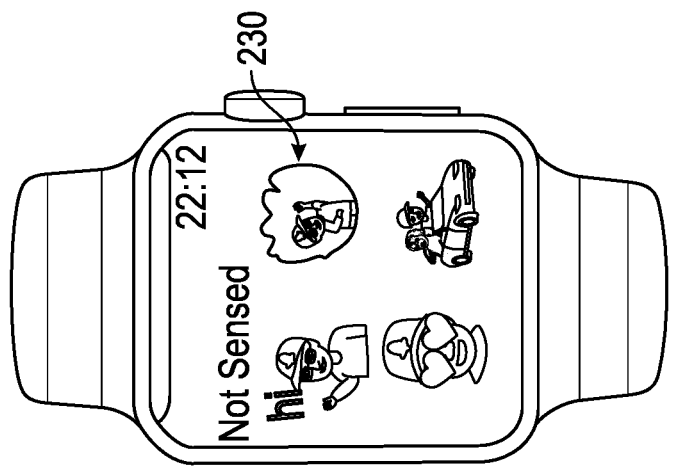
FIGS. 2A-2C illustrate a messaging user interface of a smart watch that implements the emoji recommendation system in a sample configuration, where
Figure 2B:
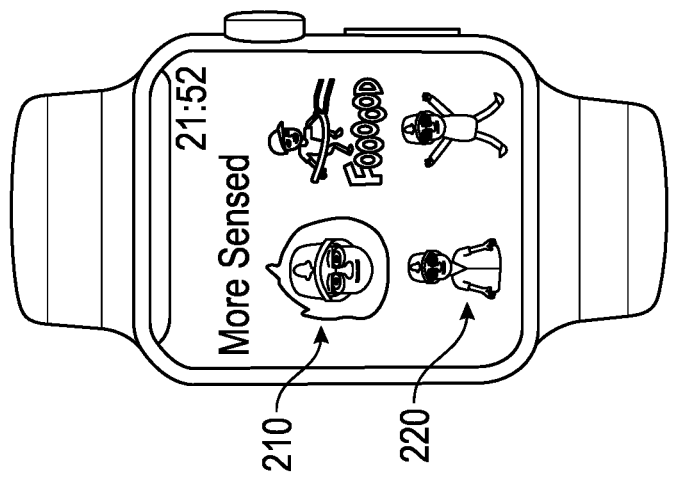
Figure 2A:
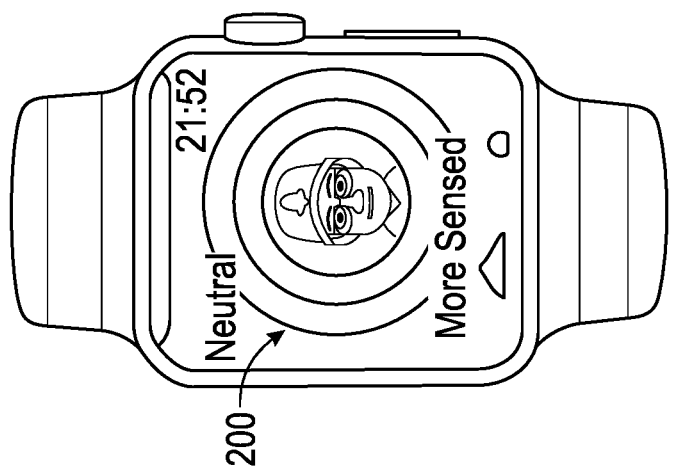

FIGS. 2A-2C illustrate a messaging user interface 170 of a smart watch that implements the emoji recommendation system 100 in a sample configuration. In the examples of FIG. 2, FIG. 2A illustrates a primary sensed Bitmoji, while FIG. 2B illustrates Bitmojis of additional sensed states and FIG. 2C illustrates Bitmojis of additional non-sensed states. FIGS. 2A-2C illustrate the Bitmoji send screen of a messaging application implemented on a smartwatch, although a similar user interface may be provided on other portable electronic devices that may implement a messaging application adapted to include the emoji recommendation system 100 described herein. In sample configurations, the Bitmoji with the highest send probability is shown larger than the others at the top of the user interface 200, as shown in FIG. 2A. Next comes a 2×N grid of predicted Bitmojis as shown in FIG. 2B, with the next two Bitmojis with the highest probabilities arranged in a first row 210, then the following two Bitmojis with the next highest probabilities arranged in a second row 220, etc. The messaging user interface 170 also may provide a third area with "non sensed" Bitmojis 230 as shown in FIG. 2C. The "non sensed" Bitmojis 230 are those that are not predicted by the state predictor 160 but are made available by the messaging application developers for selection by all users.

This design of the messaging user interface 170 including multiple possible sensed states, as well as non-sensed states, enables users to send any Bitmoji they like, without being overly constrained by the system's recommendations.

Figure 3:
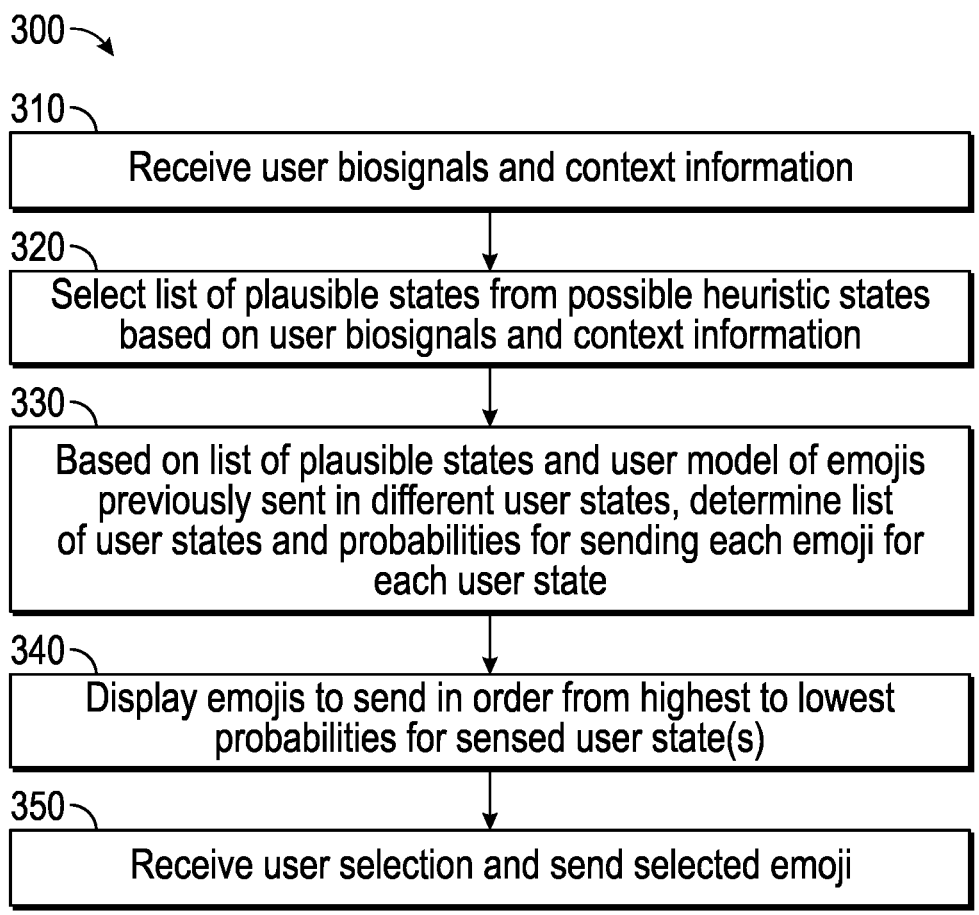
FIG. 3 illustrates a sample flow chart of the emoji recommendation method implemented by the emoji recommendation system in a sample configuration.

FIG. 3 illustrates a sample flow chart of the emoji recommendation method 300 implemented by the emoji recommendation system 100 in a sample configuration. As illustrated, the emoji recommendation method 300 receives at 310 user biosignals from the biosignal provider 110 and context information from the context sources 120 at the heuristic state selector 150. At 320, the heuristic state selector 150 selects a list of plausible user states from possible heuristic states in a heuristic state table based on the received user biosignals and context information and provides the list of plausible user states to the state predictor 160. At 330, the state predictor 160 determines from the list of plausible user states and the user model of emojis previously sent in different user states a list of user states and probabilities for sending each emoji for each user state. At 340, the recommended emojis for sending are displayed in order from the highest to the lowest probabilities based on the user's sensed state(s), as described above with respect to FIGS. 2A-2C. In response to the user's emoji selection, the messaging application sends the selected emoji to the one or more message recipients at 350. This process may be repeated for ongoing communications between two or more users.

Those skilled in the art will further appreciate that a smartwatch provides one-to-one or one-to-many communications while providing a lightweight, physical presence on the user's arm. A smartwatch and other portable electronic devices also may provide haptic intensity indicating the importance of a message and may also be used to select lenses and filters for selected augmented reality (AR) interactions. The messaging application with an emoji recommendation system 100 as described herein may be implemented on any such portable electronic devices.

Also, in additional configurations, the emoji recommendation system 100 may maintain a history of the messages sent between particular users as part of an ongoing communication between the pair of users to provide recommendations that are consistent with the emotional states, etc. of the ongoing communications. Thus, when a new message is received, the emoji recommendation system 100 would consider the emojis and states of the most recent communications between the pair of users. Also, the emoji recommendation system 100 may keep a record in the local user event database 130 of the reactions of the user to the received state of the other user. For example, if the emoji recommendation system 100 senses that the sender of a message is happy, a response selection may be provided for the message recipient that is based on the sender of the message being happy, irrespective of the state of the message recipient.

System Configuration

Techniques described herein may be used with one or more of the computer systems described herein or with one or more other systems. For example, the various procedures described herein may be implemented with hardware or software, or a combination of both. For example, at least one of the processor, memory, storage, output device(s), input device(s), or communication connections discussed below can each be at least a portion of one or more hardware components. Dedicated hardware logic components can be constructed to implement at least a portion of one or more of the techniques described herein. For example, and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

Figure 4:
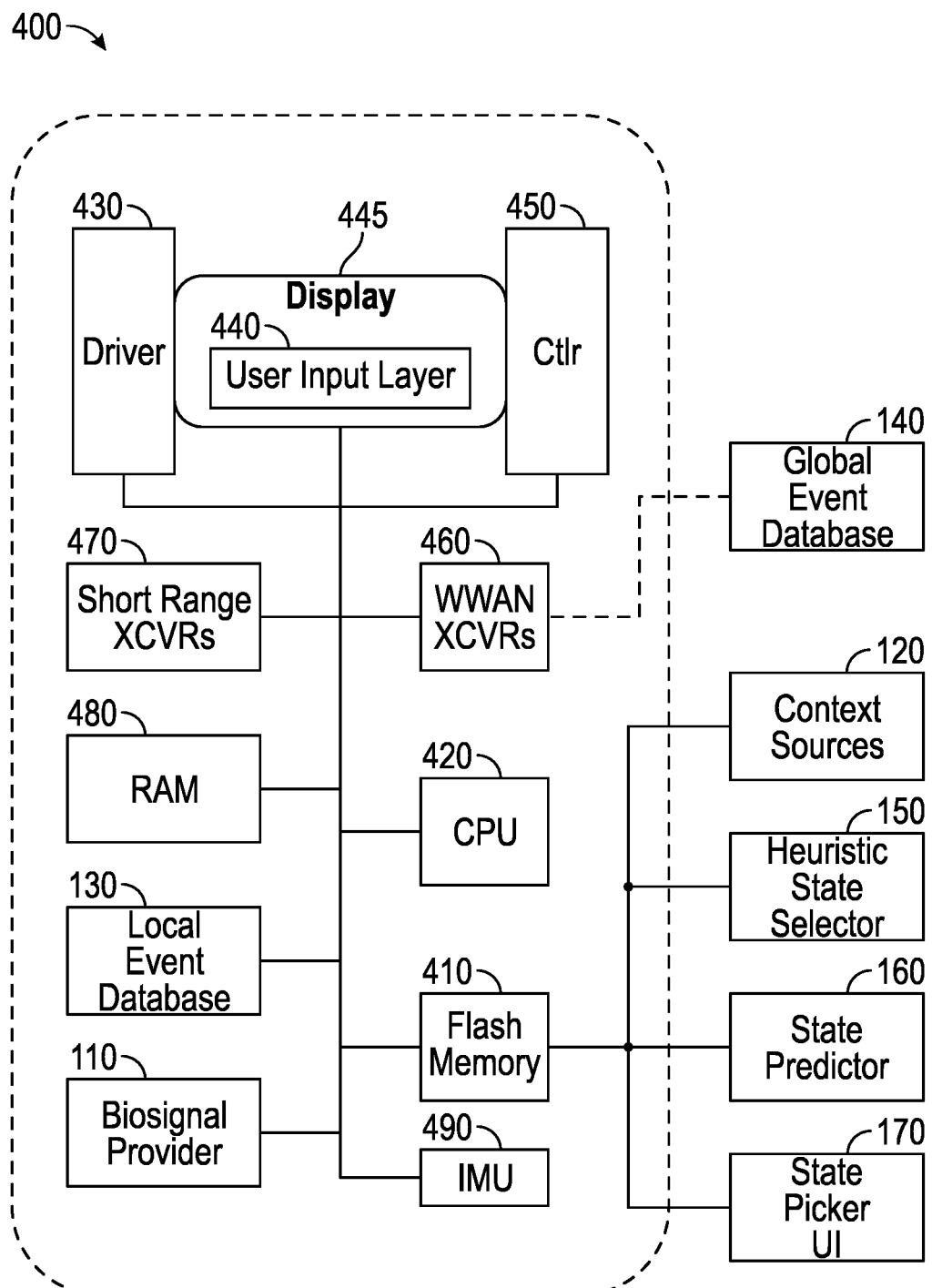
FIG. 4 illustrates a high-level functional block diagram of an example smartwatch that implements the emoji recommendation system and method in a sample configuration.

By way of example, FIG. 4 illustrates a high-level functional block diagram of an example smartwatch 400 that implements the emoji recommendation method 300 in a sample configuration. It will be appreciated that corresponding elements may also be provided in other portable electronic devices such as a smartphone and that parts of the emoji recommendation system 100 may be provided in a system server (FIG. 5). As illustrated, smartwatch 400 includes a flash memory 410 that stores programming to be executed by the CPU 420 to perform all or a subset of the functions described herein. As shown in FIG. 4, the CPU 420 of the smartwatch 400 may be coupled to biosignal provider 110, local event database 130, a mobile display driver 430, a user input layer 440 of a display 445, a display controller 450, and flash memory 410 including software for implementing the context sources 120, heuristic state selector 150, state predictor 160, and state picker user interface 170 described above with respect to FIG. 1.

When configured in a smartphone, the arrangement may further include a camera (not shown) that comprises at least two visible-light cameras (first and second visible-light cameras with overlapping fields of view) or at least one visible-light camera and a depth sensor with substantially overlapping fields of view. In such a configuration, the flash memory 410 may further include multiple images or video, which are generated via the camera.

As shown, the smartphone 400 includes an image display 445, a mobile display driver 430 to control the image display 445, and a display controller 450. In the example of FIG. 4, the image display 445 includes a user input layer 440 (e.g., a touchscreen) that is layered on top of or otherwise integrated into the screen used by the image display 445. Examples of touchscreen-type mobile devices that may be used include (but are not limited to) a smartwatch, a smartphone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 4 therefore provides a block diagram illustration of the example smartphone 400 with a user interface that includes a touchscreen input layer 440 for receiving input (by touch, multi-touch, or gesture, and the like, by hand, stylus, or other tool) and an image display 445 for displaying content.

As shown in FIG. 4, the smartwatch 400 may further include at least one digital transceiver (XCVR) 460, shown as WWAN XCVRs, for digital wireless communications via a wide-area wireless mobile communication network. By way of example, the WWAN XCVRs 460 may communicate wirelessly with the global event database 140 to receive historical user states from the user of the smartwatch 400 or from other users as prior states. The smartwatch 400 also may include additional digital or analog transceivers, such as short-range transceivers (XCVRs) 470 for short-range network communication, such as via NFC, VLC, DECT, ZigBee, BLUETOOTH®, or WI-FI®. For example, short range XCVRs 470 may take the form of any available two-way wireless local area network (WLAN) transceiver of a type that is compatible with one or more standard protocols of communication implemented in wireless local area networks, such as one of the WI-FI® standards under IEEE 802.11. In certain configurations, the XCVRs 470 also may be configured to communicate with the global event database 140.

To generate location coordinates for positioning of the smartwatch 400, smartwatch 400 also may include a global positioning system (GPS) receiver. Alternatively, or additionally, the smartwatch 400 can utilize either or both the short range XCVRs 470 and WWAN XCVRs 460 for generating location coordinates for positioning. For example, cellular network, WI-FI®, or BLUETOOTH® based positioning systems can generate very accurate location coordinates, particularly when used in combination.

The transceivers 460, 470 (i.e., the network communication interface) may conform to one or more of the various digital wireless communication standards utilized by modern mobile networks. Examples of WWAN transceivers 460 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G," or 5G New Radio, referred to as "5G." For example, the transceivers 460, 470 provide two-way wireless communication of information including digitized audio signals, still image and video signals, web page information for display as well as web-related inputs, and various types of mobile message communications to/from the smartwatch 400.

The smartwatch 400 further includes a microprocessor that functions as a central processing unit (CPU) shown as CPU 420 in FIG. 4. A microprocessor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU 420. The CPU 420, for example, may be based on any known or available microprocessor architecture, such as a Reduced Instruction Set Computing (RISC) using an ARM architecture, as commonly used today in mobile devices and other portable electronic devices. Of course, other arrangements of microprocessor circuitry may be used to form the CPU 420 or microprocessor hardware in a smartwatch, smartphone, laptop computer, and tablet.

The CPU 420 serves as a programmable host controller for the smartwatch 400 by configuring the smartwatch 400 to perform various operations in accordance with instructions or programming executable by CPU 420. For example, such operations may include various general operations of the smartwatch 400, as well as operations related to the programming for applications on the smartwatch 400. Although a microprocessor may be configured by use of hardwired logic, typical microprocessors in mobile devices are general processing circuits configured by execution of programming.

The smartwatch 400 further includes a memory or storage system, for storing programming and data. In the example illustrated in FIG. 4, the memory system may include the flash memory 410, a random-access memory (RAM) 480, local event database 130, and other memory components as needed. The RAM 480 may serve as short-term storage for instructions and data being handled by the CPU 420, e.g., as a working data processing memory, while the flash memory 410 typically provides longer-term storage.

Hence, in the example of smartwatch 400, the flash memory 410 is used to store programming or instructions for execution by the CPU 420. Depending on the type of device, the smartwatch 400 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

In sample configurations, the CPU 420 may construct a map of the environment surrounding the smartwatch 400, determine a location of the smartwatch 400 within the mapped environment, and determine a relative position of the smartwatch 400 to one or more objects in the mapped environment. The CPU 420 may construct the map and determine location and position information using a simultaneous localization and mapping (SLAM) algorithm applied to data received from one or more sensors. Sensor data may include images received from one or more cameras (when available), distance(s) received from a laser range finder, position information received from a GPS unit, motion and acceleration data received from an inertial measurement unit (IMU) 490, or a combination of data from such sensors, or from other sensors that provide data useful in determining positional information. In the context of augmented reality, a SLAM algorithm is used to construct and update a map of an environment, while simultaneously tracking and updating the location of a device (or a user) within the mapped environment. The mathematical solution can be approximated using various statistical methods, such as particle filters, Kalman filters, extended Kalman filters, and covariance intersection. In a system that includes a high-definition (HD) video camera that captures video at a high frame rate (e.g., thirty frames per second), the SLAM algorithm updates the map and the location of objects at least as frequently as the frame rate, in other words, calculating and updating the mapping and localization thirty times per second.

FIG. 5 illustrates a sample configuration of a computer system 500 adapted to implement aspects of an emoji recommendation system 100 in accordance with the systems and methods described herein. For example, the computer system 500 may implement the messaging system including the emoji recommendation system 100 described herein. In a first configuration, the computer system 500 may implement the global event database 140 for collecting emoji send data from the users of the messaging system. In a second configuration, the computer system 500 may further implement one or more of the heuristic state selector 150, state predictor 160, and state picker user interface 170 of the emoji recommendation system 100 and exchange data wirelessly with portable electronic devices running the messaging application including the emoji recommendation system 100 described herein. Computer system 500 may further be adapted to implement backend services (e.g., voice-to-text or image processing services) of the messaging system including the emoji recommendation system 100 in accordance with the systems and methods described herein.

In particular, FIG. 5 illustrates a block diagram of an example of a machine 500 upon which one or more configurations may be implemented. In alternative configurations, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. In sample configurations, the machine 500 may be a personal computer (PC), a tablet PC, a set-top box (STB), a personal digital assistant (PDA), a mobile telephone, a smart phone, a web appliance, a server, a network router, switch or bridge, or any machine capable of executing instructions (sequential or otherwise) that specify actions to be taken by that machine. For example, machine 500 may serve as a workstation, a front-end server, or a back-end server of a communication system. Machine 500 may implement the methods described herein by running the software used to implement the features described herein. Further, while only a single machine 500 is illustrated, the term "machine" shall also be taken to include any collection of machines that individually or jointly execute a set (or multiple sets) of instructions to perform any one or more of the methodologies discussed herein.

Examples, as described herein, may include, or may operate on, processors, logic, or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. The software, when executed by the underlying hardware of the module, causes the hardware to perform the specified operations.

Accordingly, the term "module" is understood to encompass at least one of a tangible hardware or software entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510 (shown as a video display), an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a mass storage device (e.g., drive unit) 516, a signal generation device 518 (e.g., a speaker), a network interface device 520, and one or more sensors 522. Example sensors 522 include one or more of a global positioning system (GPS) sensor, compass, accelerometer, temperature, light, camera, video camera, sensors of physical states or positions, pressure sensors, fingerprint sensors, retina scanners, or other sensors. The machine 500 may include an output controller 524, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage device 516 may include a machine readable medium 526 on which is stored one or more sets of data structures or instructions 528 (e.g., software) embodying or utilized by any one or more of the techniques or functions described herein. The instructions 528 may also reside, completely or at least partially, within the main memory 504, within static memory 506, or within the hardware processor 502 during execution thereof by the machine 500. In an example, one or any combination of the hardware processor 502, the main memory 504, the static memory 506, or the mass storage device 516 may constitute machine readable media.

While the machine readable medium 526 is illustrated as a single medium, the term "machine readable medium" may include a single medium or multiple media (e.g., at least one of a centralized or distributed database, or associated caches and servers) configured to store the one or more instructions 528. The term "machine readable medium" may include any medium that is capable of storing, encoding, or carrying instructions for execution by the machine 500 and that cause the machine 500 to perform any one or more of the techniques of the present disclosure, or that is capable of storing, encoding, or carrying data structures used by or associated with such instructions. Non-limiting machine readable medium examples may include solid-state memories, and optical and magnetic media. Specific examples of machine readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media. In some examples, machine readable media may include machine readable media that is not a transitory propagating signal.

The instructions 528 may further be transmitted or received over communications network 532 using a transmission medium via the network interface device 520. The machine 500 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as WI-FI®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas 530 to connect to the communications network 532. In an example, the network interface device 520 may include a plurality of antennas 530 to wirelessly communicate using at least one of single-input multiple-output (SIMO), multiple-input multiple-output (MIMO), or multiple-input single-output (MISO) techniques. In some examples, the network interface device 520 may wirelessly communicate using Multiple User MIMO techniques.

The features and flow charts described herein can be embodied in one or more methods as method steps or in one or more applications as described previously. According to some configurations, an "application" or "applications" are program(s) that execute functions defined in the programs. Various programming languages can be employed to generate one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application can invoke API calls provided by the operating system to facilitate the functionality described herein. The applications can be stored in any type of computer readable medium or computer storage device and be executed by one or more general purpose computers. In addition, the methods and processes disclosed herein can alternatively be embodied in specialized computer hardware or an application specific integrated circuit (ASIC), field programmable gate array (FPGA) or a complex programmable logic device (CPLD).

Program aspects of the technology may be thought of as "products" or "articles of manufacture" typically in the form of at least one of executable code or associated data that is carried on or embodied in a type of machine readable medium. For example, programming code could include code for the touch sensor or other functions described herein. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from the server system or host computer of a service provider into the computer platforms of the smartwatch 400 or other portable electronic devices. Thus, another type of media that may bear the programming, media content or metadata files includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to "non-transitory", "tangible", or "storage" media, terms such as computer or machine "readable medium" refer to any medium that participates in providing instructions or data to a processor for execution.

Hence, a machine readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read at least one of programming code or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A system including a messaging application that is configured to send emojis, comprising:
   at least one sensor that provides biosignals of a user of the system;
   a memory that stores instructions; and
   at least one processor that executes the instructions to perform operations including:
   receiving user biosignals from the at least one sensor;
   receiving context information from at least one context source;
   selecting, by a rule-based heuristic state selector, a list of plausible user states from possible heuristic states in a heuristic state table based on the received user biosignals and received context information;
   determining, by a state predictor from at least the list of plausible user states and a user model of emojis previously sent in different user states, a list of user states and probabilities that the user will send an emoji for each user state given the context information; and displaying recommended emojis for sending by the messaging application in order from the highest to the lowest probabilities that the user will send the recommended emojis based on a selected plausible user state.

2. The system of claim 1, wherein the at least one processor further executes instructions to perform the operations of receiving the user's selection of an emoji from the displayed recommended emojis and sending a selected emoji to one or more message recipients.

3. The system of claim 1, wherein the context information comprises at least one of temporal information, environmental information, or location information.

4. The system of claim 1, wherein the context information comprises calendar events from the user's electronic calendar or information generated by text analysis of messages sent to or from the user.

5. The system of claim 1, wherein the context information comprises information about at least one of the user's most recently launched app, apps currently running, battery level of a portable electronic device that implements the messaging application, signal sources and signal strengths, or light level of the portable electronic device.

6. The system of claim 1, further comprising a local user event database that maintains a history of user inputs and associated contexts and provides information from the user for a given context as training input to the state predictor.

7. The system of claim 6, wherein the local user event database incrementally trains the user model of the state predictor and only saves a current snapshot of the user model when the messaging application stops execution.

8. The system of claim 1, wherein the at least one processor further executes instructions to perform the operations of receiving historical user states as prior user states from a global event database and providing the historical user states to the state predictor.

9. The system of claim 1, further comprising an interface through which the user may customize heuristics of the user states or reweight the context information and specify at least one emoji to send in a customized user state.

10. The system of claim 1, wherein the state predictor implements machine learning techniques to provide predictions including a list of user states and the probability of sending an emoji for each user state from at least the list of plausible user states and the user model of emojis previously sent in different user states.

11. The system of claim 10, wherein the state predictor comprises at least one of a multi-class machine learning classifier, an artificial neural network, a decision tree, a support vector machine, or a Bayesian classification system that, given the user's context, outputs a list of predicted user states with corresponding probabilities.

12. The system of claim 11, wherein the state predictor implements Naïve Bayes classification to combine the plausible user states and context information to generate a list of most probable states in a user interface of the messaging application, where each state $S_i$ in $\{S_1, S_2, \ldots, S_n\}$ and context $C=\{C_1, C_2, \ldots, C_n\}$ is used to obtain a probability $P(S_i|C)$ of a state $S_i$ being sent given a context C by multiplying a prior probability $P(S_i)$ with a product of probabilities of the context C given $S_i$ as:

$$P(S_i|C)=P(S_i)*P(C_1|S_i)*P(C_2|S_i)* \ldots *P(C_n|S_i).$$

13. The system of claim 1, further comprising a messaging user interface that respectively displays recommended emojis for sending by the messaging application as a primary sensed emoji, emojis of additional user states from the list of plausible user states, and emojis of user states that are not from the list of plausible states.

14. The system of claim 1, wherein the at least one processor further executes instructions to perform the operations of maintaining a history of messages sent between the user and another party as part of ongoing communications between the user and the another party, considering the emojis sent and states of communications between the user and the another user during the ongoing communications, and recommending emojis that are consistent with states of the ongoing communications between the user and the another user.

15. A method of recommending emojis to send by a messaging application, comprising:

receiving user biosignals from at least one sensor;

receiving context information from at least one context source;

selecting, by a rule-based heuristic state selector, a list of plausible user states from possible heuristic states in a heuristic state table based on the received user biosignals and received context information;

determining, by a state predictor from at least the list of plausible user states and a user model of emojis previously sent in different user states, a list of user states and probabilities that the user will send an emoji for each user state given the context information; and displaying recommended emojis for sending by the messaging application in order from the highest to the lowest probabilities that the user will send the recommended emojis based on a selected plausible user state.

16. The method of claim 15, further comprising:

receiving the user's selection of an emoji from the displayed recommended emojis; and sending a selected emoji to one or more message recipients.

17. The method of claim 15, further comprising the state predictor implementing machine learning techniques to provide predictions including a list of user states and the probability of sending an emoji for each user state from at least the list of plausible user states and the user model of emojis previously sent in different user states.

18. The method of claim 17, further comprising the state predictor implementing Naïve Bayes classification to combine the plausible user states and context information to generate a list of most probable states in a user interface of the messaging application, where each state $S_i$ in $\{S_1, S_2, \ldots, S_n\}$ and context $C=\{C_1, C_2, \ldots, C_n\}$ is used to obtain a probability $P(S_i|C)$ of a state $S_i$ being sent given a context C by multiplying a prior probability $P(S_i)$ with a product of probabilities of the context C given $S_i$ as:

$$P(S_i|C)=P(S_i)*P(C_1|S_i)*P(C_2|S_i)* \ldots *P(C_n|S_i).$$

19. The method of claim 15, further comprising respectively displaying recommended emojis for sending by the messaging application as a primary sensed emoji, emojis of additional user states from the list of plausible user states, and emojis of user states that are not from the list of plausible states.

20. A non-transitory computer-readable storage medium that stores instructions that when executed by at least one processor cause the processor to recommend emojis to be sent by a messaging application by performing operations comprising:

receiving user biosignals from at least one sensor;

receiving context information from at least one context source;

selecting, by a rule-based heuristic state selector, a list of plausible user states from possible heuristic states in a heuristic state table based on the received user biosignals and received context information;

determining, by a state predictor from at least the list of plausible user states and a user model of emojis previously sent in different user states, a list of user states and probabilities that the user will send an emoji for each user state given the context information; and displaying recommended emojis for sending by the messaging application in order from the highest to the lowest probabilities that the user will send the recommended emojis based on a selected plausible user state.

* * * * *